Aug. 23, 1966 G. E. HAGEN 3,268,877

FLOATING MAGNETIC TRANSDUCING HEAD

Filed May 26, 1954 6 Sheets-Sheet 1

INVENTOR.
GLENN E. HAGEN
BY Strauch, Nolan & Diggins
ATTORNEYS

INVENTOR.
GLENN E. HAGEN
BY Strauch, Nolan & Diggins
ATTORNEYS

Aug. 23, 1966 G. E. HAGEN 3,268,877

FLOATING MAGNETIC TRANSDUCING HEAD

Filed May 26, 1954 6 Sheets-Sheet 3

INVENTOR.
GLENN E. HAGEN
BY
Strauch, Nolan & Diggins
ATTORNEYS

FLOATING MAGNETIC TRANSDUCING HEAD

Filed May 26, 1954 6 Sheets-Sheet 4

INVENTOR

GLENN E. HAGEN

BY Strauch, Nolan & Diggins

ATTORNEYS

INVENTOR
GLENN E. HAGEN

BY Strauch, Nolan & Diggins
ATTORNEYS

FLOATING MAGNETIC TRANSDUCING HEAD

Filed May 26, 1954

INVENTOR
GLENN E. HAGEN
BY Strauch, Nolan & Diggins
ATTORNEYS

United States Patent Office 3,268,877
Patented August 23, 1966

3,268,877

FLOATING MAGNETIC TRANSDUCING HEAD

Glenn E. Hagen, Manhattan Beach, Calif., assignor, by direct and mesne assignments, to Alwac International Incorporated, a corporation of Panama Filed May 26, 1954, Ser. No. 432,534
27 Claims. (Cl. 340—174.1)

The present invention relates to improvements in magnetic recording devices, and more particularly to improvements in magnetic recording devices for recording discrete data indicative signals upon a magnetizable record medium. This application is a continuation-in-part of my copending application Serial No. 408,480 filed October 30, 1953, now abandoned.

The intelligence and usefulness of the modern automatic computing machine depends almost entirely on how fast and how well it can store and retrieve information. In fact perhaps the biggest factor holding back full scale application of automatic computing equipment in business and other broad fields is the want of a really large memory. The memory in a machine ought to be permanent, keeping information undamaged even if the power fails, be highly reliable, provide easy access and be vast in extent. Magnetic drums have recently become popular as a way of storing information for electronic computers. The greatest drawback, however, is often the lack of large storage capacities. Small diameter drums have had limited application because they require many separate channels of information and therefore require many magnetic heads to read and record and consequently also require in addition a lot of the associated switching and amplifying equipment. Large diameter drums on the other hand have been limited in the density of information that can be recorded on them and this limitation has been largely due to requirements of exact spacing between the drum surface and the magnetic head. Heretofore, efforts to build large diameter drums that meet these spacing requirements accurately have required almost solid metal drums to achieve the necessary close tolerances and this has led to the use of very heavy and expensive drums.

Theoretically a magnetic head for reading or writing impulses on a drum or disk is an almost perfert magnetic dipole and its field of strength varies inversely as the cube of the distance between the poles and the surface of the recording medium. In ordinary operation, a signal is written on the recording medium and subsequently played back. This means that even the smallest variations in the distance between the head and recording medium result in large variations in the played back signals. Only by close contact spacing can information be recorded densely on the recording medium, and if the head position is fixed, the recording medium must move past it very accurately.

An example of an attempt to solve this problem through the use of an air film for spacing the recording medium from the head is disclosed in United States Letters Patent No. 2,612,566 issued September 30, 1952 to Anderson et al. This patent suggests the use of air pressures and an air gap chosen so that the Bernoulli effect is utilized to provide both the force tending to hold together and the force tending to separate the recording medium from the head. However it has been found that the Bernoulli effect is observable only with a spacing between the head and the recording drum several times larger than the optimum spacing providing good recording definition for discrete data signals as is required in high speed computers. Furthermore, to establish an air flow rate exhibiting the Bernoulli effect, a relatively low air pressure must be used and consequently the forces available for correcting the position of the head as irregularities on the periphery of the drum are encountered are several times less than the force which is necessary to provide optimum positioning of the head.

It is accordingly a primary object of the present invention to provide an improved magnetic recording device, in which the relative spacing between the electromagnetic head and the surface of the relatively movable recording medium is maintained at a substantially constant minimum value independently of absolute movement of either the record or the recording head.

It is another primary object of this invention to provide such a constant spacing between the electromagnetic head and the surface of the relatively movable recording medium wherein the head operates at a very close spacing which is provided by a fluid film under high pressure.

It is still another very important object of this invention to provide such a constant spacing between the electromagnetic head and the surface of the relatively movable recording medium wherein means are provided to insure that the electromagnetic head cannot contact the record medium upon the failure of the supply of fluid pressure.

More specifically it is an object of the present invention to provide an improved fluid floating electromagnetic head which is pneumatically biased toward the surface of the record medium by fluid under pressure which fluid also effects the floating film between the record medium and the electromagnet head.

It is a further important object of the present invention to provide a fluid floating electromagnetic head and mount of such improved construction that the electromagnetic head is automatically retracted from its position adjacent the record medium to prevent any possibility of damage to the surface of the record medium as a result of failure of supply of the fluid.

A further object of this invention is to provide an air lubricated electromagnetic head of such low mass that it can move rapidly and follow any bulges or hollows on the recording surface without changing the distance between the head and the surface.

More specifically it is an object of this invention to provide a low mass air lubricated electromagnetic head which is biased away from the recording medium and which is fluid biased toward the recording medium to float upon a fluid film and to retract from the recording medium upon failure of the fluid supply.

A still further specific object is to provide a pneumatically controlled freely movable electromagnetic head not requiring a fluid tight seal between the outer surface of a piston and the inner surface of the cylinder.

A further object of the present invention is to provide a light weight low cost mount for an air lubricated electromagnetic head by the provision of an expansible fluid chamber in the form of a bellows whereby pistons and flexible hoses are eliminated.

A further object of this invention is to provide an improved and more reliable mount for an air lubricated electromagnetic head which insures that the head will back away from the recording surface of the record medium leaving it undamaged in the event the air pressure fails.

It is another object of this invention to provide an electromagnetic head mount as set out in the preceding object wherein the head retraction is accomplished by a flexible spring which connects the movable recording head assembly to a fixed frame so that when air pressure fails, the bellows contracts and the elasticity of the spring leaf and of the bellows causes the head to pull away from the surface.

It is a further object of this invention to provide an improved electromagnetic recording apparatus embodying a series of coaxial axially spaced disks and a floating electromagnetic head structure and mount therefore which permits the sensing of any annular track upon any of the series of disks selectively.

A further and more specific object of this invention is to provide an improved electromagnetic head for use with a disk type record medium in which a pair of light weight electromagnetic heads are disposed on opposite sides of the disk record medium in opposed relation and are separated from that disk only by a thin fluid film layer.

It is a further object of this invention to provide a pair of electromagnetic heads as defined in the foregoing object wherein each head is biased away from the disk so as to be removed a safe distance therefrom in the event of failure of the fluid supply.

A still further object of this invention is to provide an improved electromagnetic recording device which permits access to all disks of a coaxial axially spaced disk type record medium by a single pair of opposed air floating electromagnetic heads through the provision of a carriage mount for bellows and spring assemblies supporting the electromagnetic heads, which carriage can travel axially along the stack of disks and pivot in such a manner that the pair of heads can reach over the useful recording surface of each disk.

These and other objects of this invention will become more fully apparent by reference to the appended claims and as the following detailed description proceeds in reference to the accompanying drawings wherein:

The basic principle of the present invention is to provide a magnetic recording device wherein the electromagnetic transducing heads, whether they be read, record or erase heads, are mounted for movement in a path normal to the record surface and are spaced therefrom a distance in the range of a mil or less to practically rest upon the adjacent surface of the record medium. The spacing from that surface is provided only by a thin film of air or other suitable fluid which serves as a lubricant permitting free relative movement between the head and the record medium. The present invention incorporates with the above described apparatus a safety feature which automatically removes the head from the record medium in the event the thin film of lubricating fluid is lost to prevent damage to the head and record medium.

Figure 1:
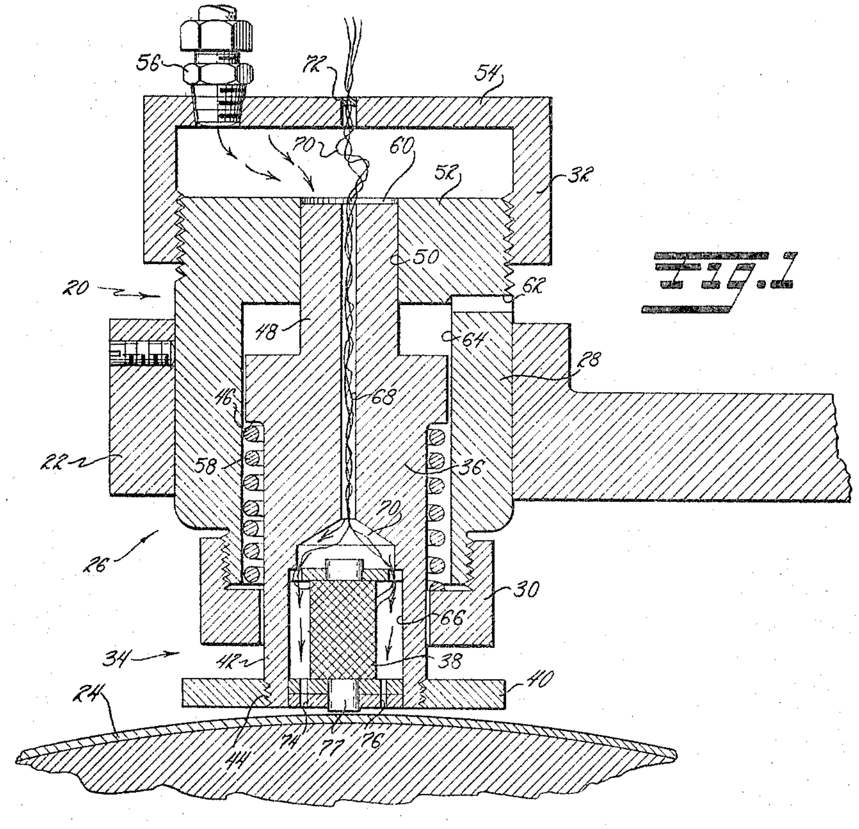
FIGURE 1 is a diametral section through a piston mount for a fluid floating electromagnet head in accordance with the broader aspects of the present invention.

Referring now to FIGURE 1, the illustrated fluid floating electromagnetic head assembly 20 is mounted upon a fixed support 22 in spaced relation to the movable record medium 24 which may be of the drum type. The fluid floating electromagnetic head 20 consists basically of a fixed assembly 26 and a movable assembly 34. The fixed assembly 26 includes a body member 28, an end cap 30 and an opposite end cap 32 and is fixed to the support structure 22, while the movable assembly 34 includes a piston 36, an electromagnetic head 38 and an air guide plate 40 adjacent the surface of the record medium 24. The piston 36 is formed with an elongate cylindrical portion 42, the lower end of which is threaded at 44 for attachment of the air guide plate 40, an enlarged annular shoulder portion 46, and a reduced end portion 48 which is slidably received within a through bore 50 of the end wall 52 of the body member 28. End cap 32 and the adjacent surface of the end wall 52 define a fluid chamber 54 into which a suitable fluid such as air is introduced through the fluid fitting 56. Piston 36 is normally biased from the record medium 24 by a compression spring 58 which is compressed between the annular shoulder 46 on piston 36 and the interior end wall of the cap 30 as shown. The fluid in the expansible chamber 54 is introduced under pressure through the fitting 56 and acts upon the end face 60 of the piston 36 to pneumatically bias the piston 36 toward the record medium 24 in opposition to the resilient biasing force of the spring 58. A bleed aperture 62 may be formed through the side wall of the body member 28 to permit communication between the atmosphere and the chamber 64 defined between the shoulder 46 of the piston 36 and the adjacent base of the end wall 52.

The piston 36 is formed at its end adjacent the record medium 24 with an end bore 66 in which the electromagnetic head 38 is mounted. Coaxial with the end bore 66 is a through conduit 68 extending longitudinally of the piston 36 and providing fluid communication between the fluid pressure chamber 54 and the end bore 66 of piston 36. Electrical connections to the electromagnetic head 38 are provided by lead wires 70 extending from the electromagnetic head 38 through the conduit 68 into the chamber 54 and through a fluid tight seal 72 in the opposite end wall of the cap 32. As is shown, the portion of the lead 70 betwen the seal 72 and the piston 36 is sufficient to permit free movement of piston 36 without placing tension upon the leads 70.

The longitudinal passageway 68 provides a small bleed aperture from chamber 54 through which fluid under pressure passes into the end bore 66 of the piston 36. A pair of apertures 74 and 76 may be provided on the opposite sides of the electromagnet head 38 and the fluid bled through passageway 68 passes through their apertures to the space between the guide plate 40 and the adjacent surface of the record medium 24.

In operation, pressure of air within the chamber 54 acting upon the end face 60 of the piston 36 pneumatically biases the piston 36 and the electromagnetic head 38 mounted thereon toward the adjacent surface of the record medium 24. The air escaping from the chamber 54 through the longitudinal aperture 68 into the end bore 66 and thence through apertures 74 and 76 forms a thin air film between the adjacent surfaces of the air guide plate 40 and the record medium 24 to provide an air bearing, which assures separation of the electromagnetic head 38 from the surface of the record medium 24 an optimum minimum distance while preventing actual contact between the fluid mounted electromagnetic head 20 and the record medium 24.

The fluid pressure in chamber 54 acts upon the face 60 of the piston 36 to provide a force which tends to bring together the electromagnetic head 38 and the record medium 24, the amount of force being dependent upon the amount of fluid pressure in chamber 54 and upon the area of the face 60 of the piston 36. The spring 58 provides a force which tends to separate the head 38 from the record medium 24 and when the fluid pressure in chamber 54 drops to atmospheric the head 38 is rapidly lifted away from the record medium 24 by the spring 58. In operation the spring 58 urges the head 38 away from the record medium while the larger pneumatic force on the end face 60 of the piston 36 urges the head 38 toward the record medium 24. The head is kept from contacting the record medium by the high pressure film of air which exists between the guide plate 40 and the record medium 24 by virtue of the apertures 74 and 76.

Figure 2:
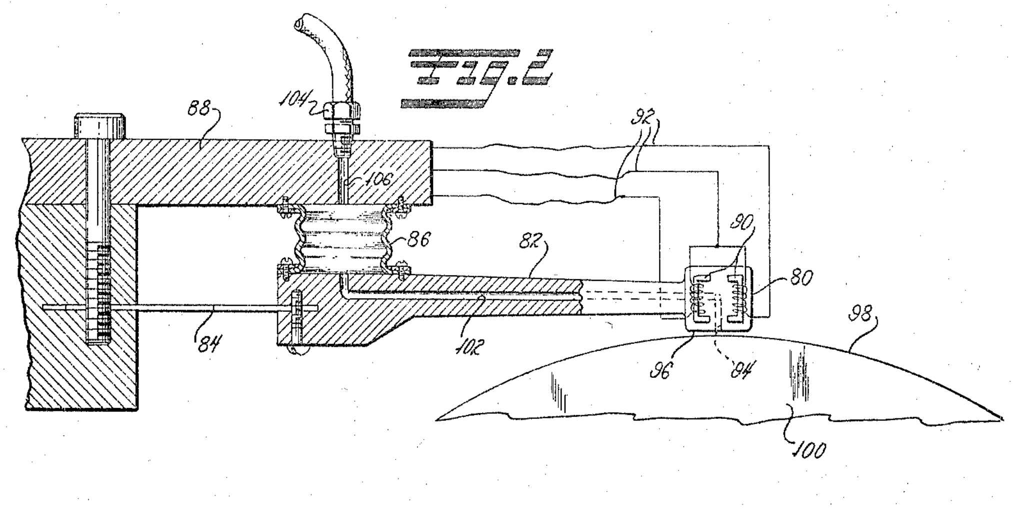
FIGURE 2 is a view partically in section illustrating a preferred form of fluid floating electromagnetic head and mount therefore.

A modified and preferred form of the invention herein is disclosed in FIGURE 2. In this embodiment of the invention, a lightweight electromagnetic head 80 is fixed upon the end of a lightweight longitudinally apertured arm 82 which is mounted by a broad, thin leaf spring 84 and a bellows 86 upon a fixed support structure 88. The head 80 is provided with electromagnet 90 which may be selectively energized through lead wires 92, and is also provided with spaced apertures 94 extending to the end face 96 of the head 80 adjacent the peripheral surface 98 of the electromagnetic record drum 100.

These apertures 94 need not be located near the gaps in the electromagnets but are preferably symmetrically placed with respect to the electromagnets 90 and may be spaced on the end face anywhere within an area whose periphery is removed from the periphery of the end face by approximately five aperture diameters.

The fluid passageway 102 extending longitudinally of the arm 82 provides fluid communication between the chamber formed internally of bellows 86 and the apertures 94. A fluid under pressure, such as compressed air, is introduced into the bellows 86 selectively by a suitable fluid fitting 104 and aperture 106.

When a compressed fluid is introduced into the bellows 86, the bellows expand in a direction along the longitudinal axis thereby deflecting leaf spring 84 and lowering the arm 82 and head structure 80 to a position closely adjacent the peripheral surface 98 of the drum 100. The compressed fluid within the bellows 86 is carried by the passageway 102 and the communicating apertures 94 to the area between the adjacent surfaces 96 and 98 of the recording head and drum to provide a thin film of compressed fluid therebetween to prevent contact. In the event the supply of compressed fluid fails, the bellows 86 will contract and the spring 84 will return to its original position lifting the arm 82 and the head 80 from its operating position adjacent the peripheral surface 98 of the drum 100.

Figure 3:
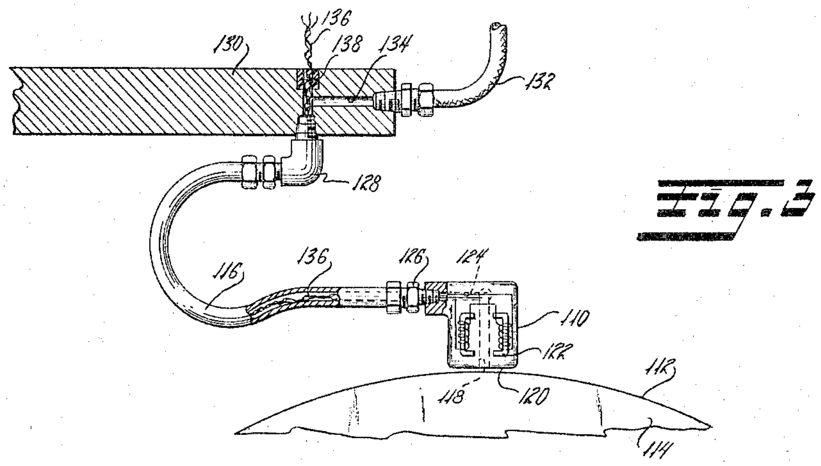
FIGURE 3 illustrates a modified form of mounting structure for a fluid floating electromagnetic head for cooperating with a drum type record medium.

A further embodiment of a mount for the fluid floating electromagnetic head for use with a record drum is illustrated in FIGURE 3. In this embodiment of the invention, the electromagnetic head structure 110 is supported adjacent the peripheral surface 112 of a drum 114 by a flexible tubing 116 bent in a substantially U-shaped configuration as shown in FIGURE 3. Head structure 110 is provided with apertures 118 in end face 120 adjacent the peripheral surface 112 of the drum 114. Fluid channels lead from these apertures 118 along each side of the electromagnets 122 upwardly through the head structure 110 into fluid communication with fluid passageway 124 into which fluid is introduced from the tubing 116 by a fluid connection 126.

Tubing 116 is attached to a fixed support structure 130 by fluid fitting 128 through which fluid under pressure is introduced into tube 116 from a suitable compressed fluid supply duct 132 by a communicating passage 134. The electrical leads 136 through which the electromagnetic coils 122 are selectively energized extend into the fixed support 130 through a fluid tight seal 138. The leads extend through the fluid tight fitting 128 and then through the tube 116 into the head 110 where they are connected to the electromagnets 122.

The fluid introduced under pressure into the tube 116 passes around these wires 136 and escapes by the apertures 118 through the region between the surfaces 120 and 112 on the head 110 and drum 114, respectively. Due to the configuration of the tubing 116 and its resiliency, the introduction of fluid pressure into tube 116 causes it to expand and shift the lightweight head 110 toward the drum 114 by the same principle upon which the Bourdon tube operates. The air film formed by the escaping air is the sole separation between the surfaces 112 and 120 and in the event the supply of compressed fluid fails, the resiliency of the tube 116 restores the head 110 to its position remote from the surface 112 of the drum 114.

Figures 4, 5:
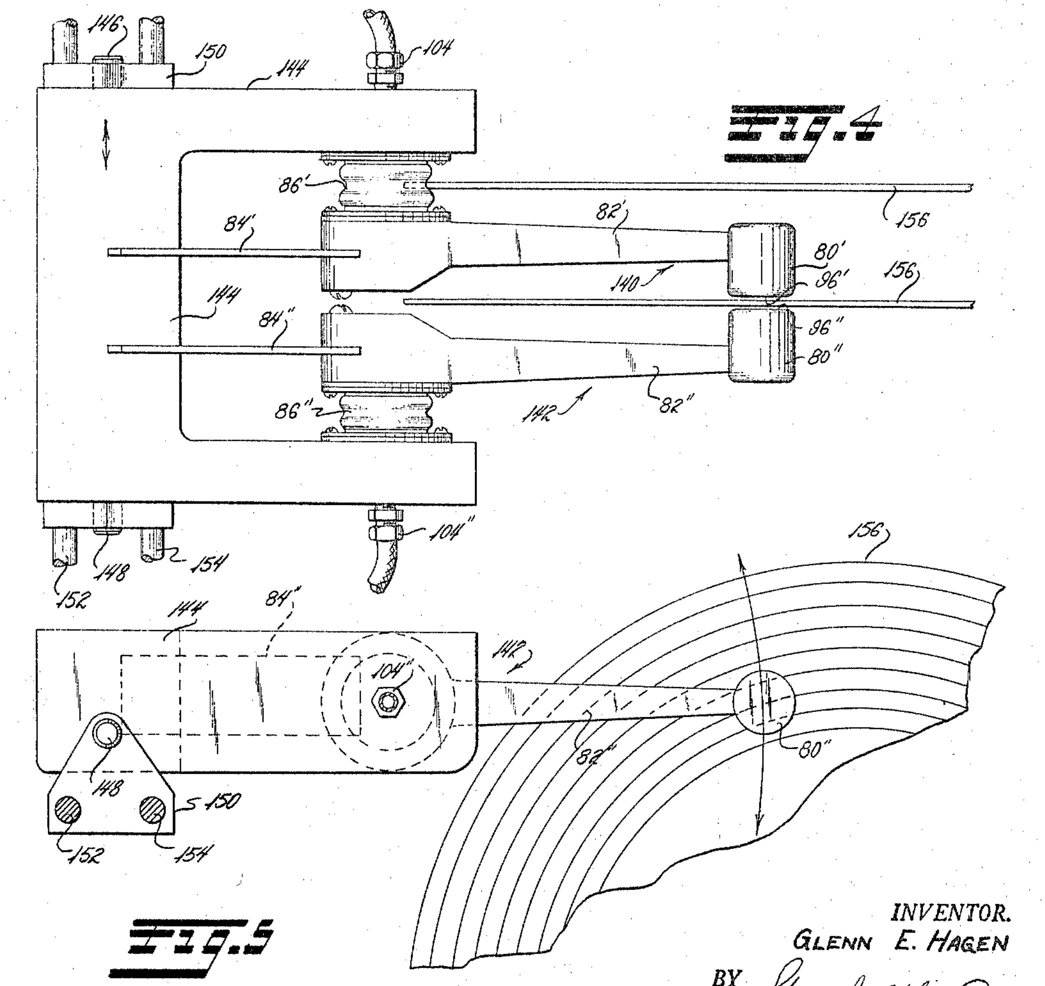
FIGURE 4 is a view of a dual head electromagnetic recording device of the fluid floating type adapted for selective coaction with each of a plurality of disks in a coaxial disk type record medium.
FIGURE 5 is an elevation view of the structure illustrated in FIGURE 4.

FIGURES 4 and 5 illustrate the preferred adaptation of the principles of the present invention to magnetic record disks as a recording medium.

In this embodiment of the present invention, a pair of opposed electromagnetic head assemblies 140 and 142 are mounted upon a support 144 which is pivotally mounted by stud shafts 146 and 148 upon a carriage 150 that is mounted for longitudinal displacement along spaced parallel guide rails 152 and 154. The pivot axis of support 144 upon carriage 150 is parallel to the path of movement of carriage 150 along the guide rails 152 and 154. A plurality of electromagnetic record disks 156 are mounted for rotation about an axis spaced from and parallel to the pivot axis of the support 144. The axis of rotation of the disk 156 is so spaced from the pivot axis of the support 144 that the support 144 may be pivoted to a position in which the electromagnetic head assemblies 140 and 142 are outside of the projection of the periphery of the disks 156 so that the support 144 together with electromagnetic record head assemblies 140 and 142 may be shifted longitudinally along the guide rails 152 and 154. In the configuration of the assembly illustrated in FIGURES 4 and 5, the electromagnetic record head assemblies 140 and 142 are shown in operative positions embracing one of the record disks therebetween. The electromagnetic record head assemblies 140 and 142 are each preferably identical to the assembly illustrated in FIGURE 2 but are mounted in opposed relation as shown.

Assembly 140 comprises a head 80′ at the end of a light weight arm 82′ which is flexibly supported by a flat leaf spring 84′ fixed at its opposite ends to the support 144 and the arm 82′ as illustrated in FIGURE 2. The arm 82′ is also supported by a flexible bellows 86′ which is axially expandable under the influence of fluid pressure supplied through the fitting 104′ in the same manner as illustrated in FIGURE 2. Similarly, assembly 142 comprises a head 80″ at the end of a light weight arm 82″ which is flexible supported by a flat leaf spring 84″ and which is movable under the control of the expansible metal bellows 86″.

Because of the opposed and counterbalancing nature of the forces exerted by the two opposed heads 80′ and 80″ the magnetic record disks 156 may be extremely thin and free of support except at their centers where they are mounted for rotation. In addition the fluid apertures need not be located in any particular area as discussed in connection with FIGURE 2, nor is there any need for surfaces 96′ and 96″ of any appreciable extent.

Failure of the fluid pressure supply effects a contraction of the expansible bellow chambers 86′ and 86″ which cooperate with the springs 84′ and 84″ to separate the heads 80′ and 80″.

The use of the springs 84′ and 84″ assures proper movement upon expansion of the bellows 86′ and 86″ so that the surfaces of the heads 80′ and 80″ adjacent the disk 156 are in parallel relation to the surfaces of the disks. By this construction extremely thin disks may be used.

When the support 144 is pivoted so that the heads 80′ and 80″ are clear of the disks 156, the carriage 150 may be moved along the guide rails 152 and 154 to align the assemblies 140 and 142 to embrace any selected one of the plurality of axially spaced coaxial disks 156. The support 144 may then be tilted toward the axis of rotation of the disks to embrace the selected disk 156 and the pair of opposed heads may be swung over the entire useful recording area of the disks. When a shift from one disk to another is being made the air supplied via the fluid pressure connections 104′ and 104″ is momentarily released by a valve, not shown so that the heads may spread apart under the influence of the springs 84′ and 84″ to prevent their contact with the disks 156. Air pressure is again applied when the pairs of heads have been properly positioned on the newly selected disk.

While in the preferred illustrated form the expansible chamber controlling the movement of the arm 82 upon which the record head 80 is mounted has been illustrated as provided by the bellows 86, it will be appreciated that any suitable expansible chamber may be provided. Similarly, guide rods 152 and 154 may be circular with disks extending radially from a common center instead of being straight as illustrated in the drawing.

Figures 6, 7:
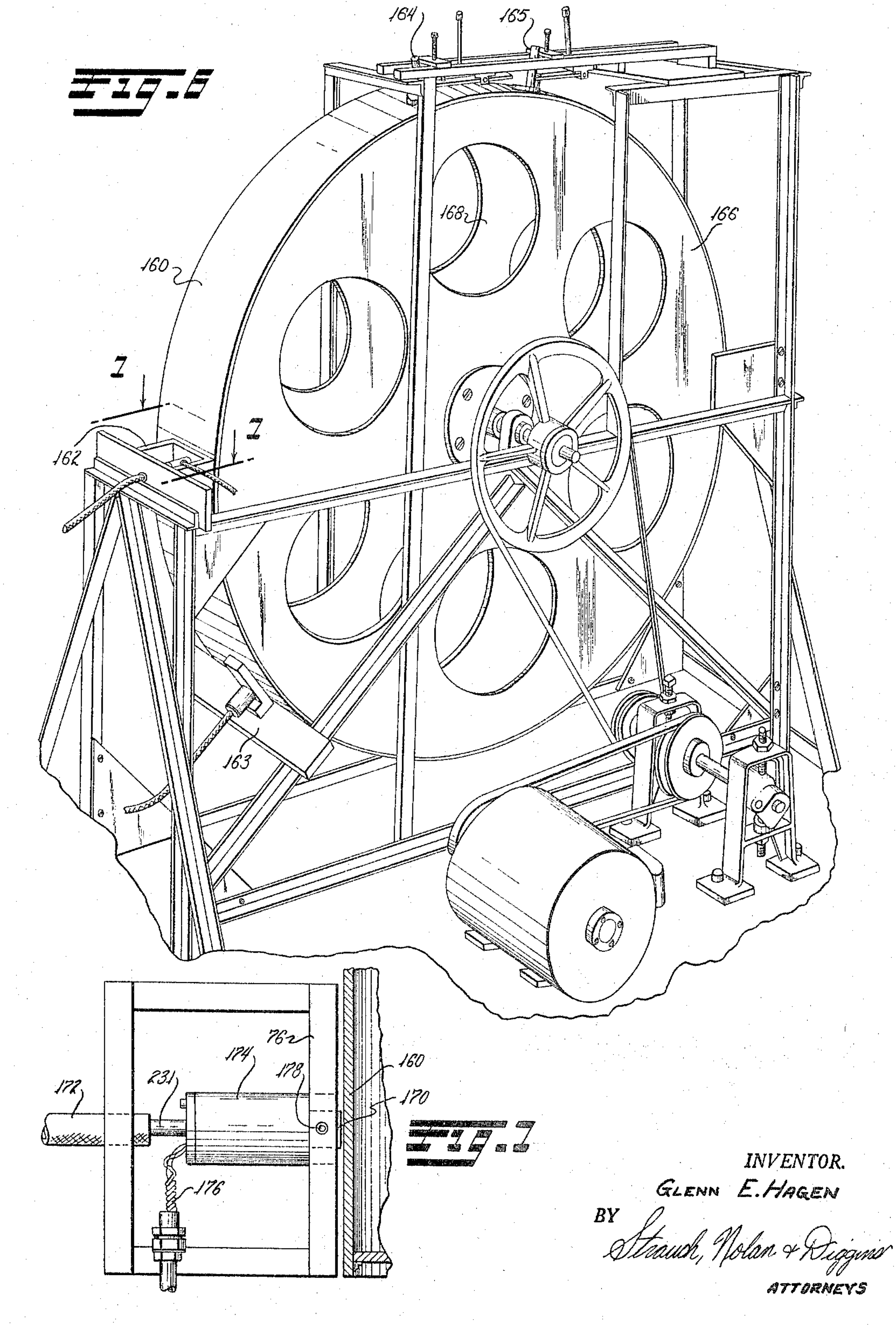
FIGURE 6 shows a large drum having yet other modifications of head mountings.
FIGURE 7 is a partial plan view in section of FIGURE 6 as seen when looking in the direction of arrows 7—7 showing the details of a mounting of another type head.

FIGURE 6 is a pictorial view of a large drum having a magnetic coating 160. Drums having a diameter in the range of four feet have been successfully used with a recorder as shown in my copending application entitled, "Computer," filed August 18, 1953, and having Serial No. 374,987, now Patent No. 2,999,636. Two additional modifications of the recording head mountings are shown, one type at 162 and 163 and the other at 164 and 165. It is noted that the interior of the drum may be inexpensively made as of two sheets 166 and 168 of wood or any other desired material. The space between sheets 166 and 168 may be hollow and large holes may be cut out to reduce the weight of the drum.

The drum periphery does not have to be manufactured precisely circular as in prior practice, but may deviate a reasonable amount since the floating heads are capable of following minor variations.

FIGURE 7 is an enlarged view of the recording head embodiment shown at 162 as looking in the direction indicated by line 7—7 in FIGURE 6. The fluid pressure for maintaining proper spacing between recording head 170 and recording medium 160 is supplied through conduit 172 into housing 174, an exploded view of which is shown and described in connection with FIGURE 9. Lead-in wires 176 are connected to the electromagnetic coils and housing 174 is rigidly connected to a frame member 176 by set screw 178.

Figures 8, 9:
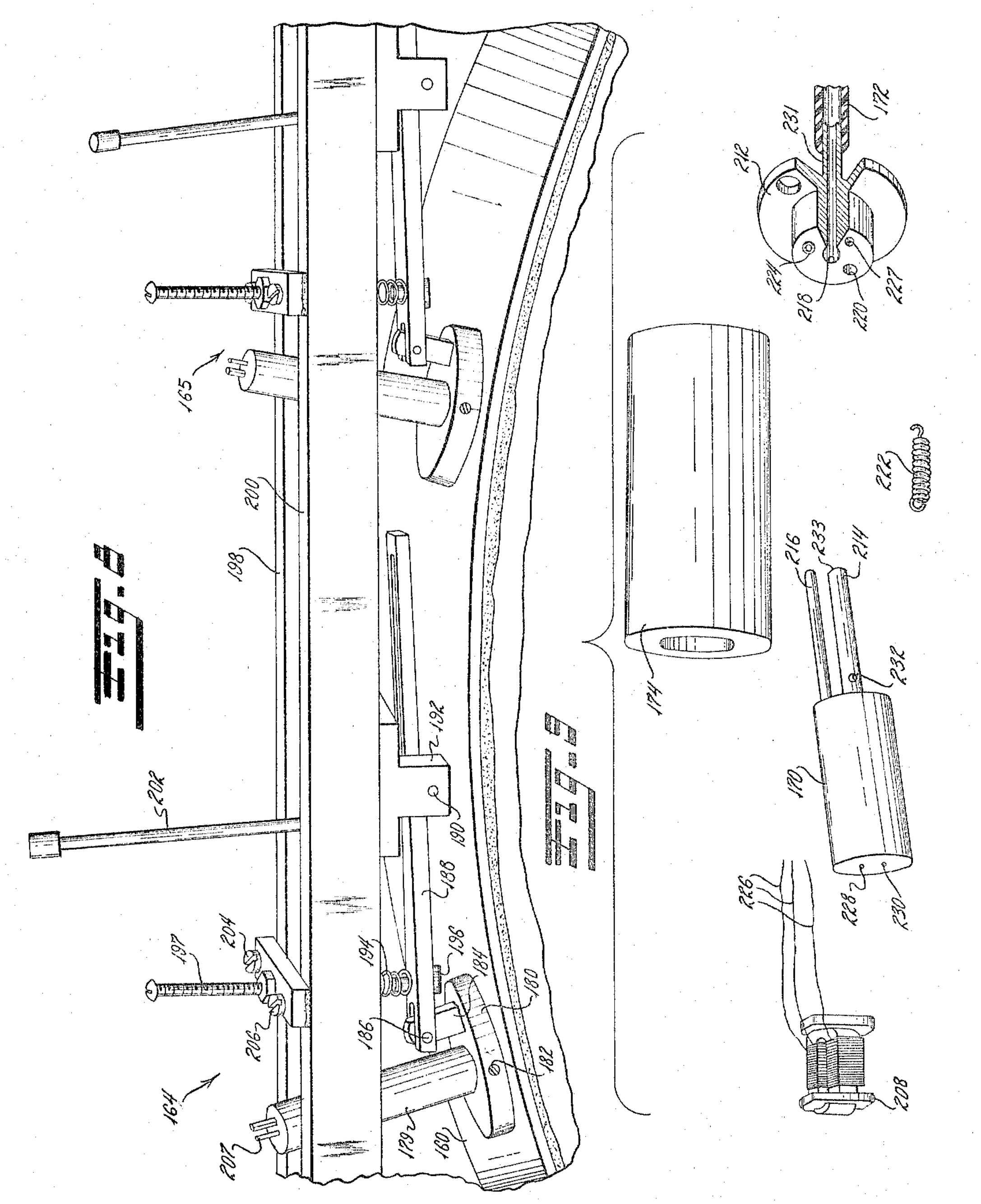
FIGURE 8 is a partial elevation view in section of FIGURE 6 showing the details of still another mounting modification.
FIGURE 9 is an exploded view of the recording head used in FIGURE 7.

In FIGURE 8 there is shown an enlarged view of the top portion of the drum 160 and recording heads 164 and 165 shown in FIGURE 6. Since the structure of the two heads 164 and 165 is identical a description will be had of head 164 only.

According to this embodiment of the invention the electromagnetic recording head is mounted inside a tube 179 which is held in an air guide plate 180 by set screw 182. Extending from air guide plate 180 is a stud 184 pivotally mounted about a pin 186 in a bifurcated lever 188 which is in turn pivotally mounted about a pin 190 on support member 192. Lever 188 is freely pivotable about pin 190 while stud 184 is frictionally mounted with a tight fit at pin 186 so that guide plate 180 may be positioned normal to the radius of the drum at the desired operating location. The lever 188 is provided with a bolt 196 near the stud 184 and the bolt may be provided with a hole or other means for mounting one end of an expansion spring 194 which is fastened at its other end to a screw 197. By means of the expansion spring 194 the lever 188 and guide plate 180 are resiliently supported for pivotal motion about the pin 190.

By adjustment of spring 194 the position of guide plate 180 may be adjusted to obtain the desired spacing from the recording medium 160 for optimum operation.

The support member 192 is slidably mounted on the frame and may be slid along frame members 198 and 200 by handle 202 to move the air guide plate 180 along a portion of the recording surface 160 or to remove it completely away if desired to change the components of the recording heads. Screws 204 and 206 are removable to permit screw 197 and spring 194 to be moved with the movement of the head. Terminals 207 may be provided on tube 179 to carry both the necessary electrical wires and the fluid under pressure to the electromagnet recording head. A fluid conduit extends through tube 179 and terminates in apertures, not shown, in air guide plate 180. The compressed fluid in this modification is used to supply the force tending to separate the plate 180 from drum 160 and in some instances, also the force tending to hold the plate 180 adjacent drum 160.

The basic principle involved is that which is utilized in well known high school physics demonstrations where it is demonstrated that it is impossible to blow a piece of paper off the end of a spool by blowing through the aperture of the spool. Not only does the air film between the electromagnetic head and the adjacent surface of the record medium prevent the head from scrapping on the adjacent surface of the record medium but also a suction forms as the result of a high velocity discharge of air from the center of the adjacent areas of the drum and record medium to prevent the head from bouncing away from the record medium.

According to this facet of the invention the pressure of the air supply must be low enough to cause the formation of a sub-atmospheric pressure area between the face of the plate 180 and the surface of the record medium 160. This low pressure area provides an attractive force between the head and the drum and serves as a substitute for the pneumatic chamber utilized in the other embodiments of the invention. Thus this low pressure type head positioning may be achieved with a one-half inch diameter air guide plate and a spacing between the guide plate and record medium of two and one half mils. Under these conditions a positioning force of approximately 15 grams is exerted on the head to properly space it from the record medium.

The second recording head 165 is mounted on the same frame and may be mounted directly in line with recording head 164 or slightly off-set as desired and any number of heads may be placed around the periphery of the drum.

FIGURE 9 shows the details of the recording head shown mounted in FIGURE 7. According to this embodiment there is provided a coil assembly 208 which is inserted inside a hollow cylinder 170 which in turn is slidably mounted inside a larger cylinder 174. A cap 212 then fits on cylinder 174 and a plug member, not shown, closes cylinder 170 and has extending therefrom a hollow tube 214 and guide pin 216 which mate with holes 218 and 220, respectively. A tension spring 222 attaches to a loop 224 on the cap 212 and also connects to a corresponding loop, not shown, on the plug member in cylinder 170. This spring assembly biases the head away from the magnetic recording medium. The electrical leads 226 extend from the cylinder 170 through the hollow tube 214 and pass out through an aperture 232. The aperture 232 is sealed with a fluid seal and the leads 226 are led to the exterior of the recording head through the aperture 227 in cap 212.

Referring now also to FIGURE 7 there is shown a fluid pressure hole 172 connected to the tube 231 on the outside of cap 212, and fluid under pressure acting against the end surface 233 of tube 214 causes the head assembly to move toward the recording medium 160 against the tension of spring 222. The fluid escaping through apertures 228 and 230 reacts with the record surface 160 to provide the proper small spacing for good recording and play back definition and the air bearing thus provided between the head and the drum provides a substantially constant spacing regardless of slight irregularities of the contour of the periphery of the drum.

Figure 10:
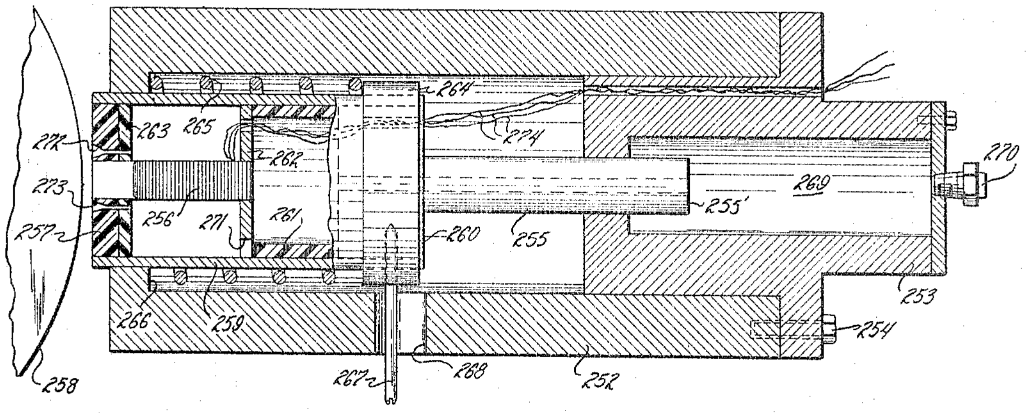
FIGURE 10 is a diametral section through another embodiment of a piston mounted electromagnetic head.

In the embodiment shown in FIGURE 10, the transducer comprises a fixed assembly including the body member 252 and end cap 253 which are held together as by bolt 254, and a movable assembly which includes a piston 255 and a hollow cylinder 259 which carries an electromagnetic head 256 terminating in a plastic potted portion 257 adjacent the record medium 258. A plug 260 on piston 255 is force fitted in a fluidtight relationship in the end of the cylinder 259 and projects against an annular sleeve 261 which in turn fits against the washer 262. The washer 262 and an additional washer 263 hold in assembled relation the coil and core assembly of head 256. A spring retaining ring 264 fits around the inner end of the cylinder 259 and provides an annular shoulder against which a spring 265 is compressed. The outer end of the spring 265 presses against the annular shoulder 266 of the body member 252. A limit pin 267 fits in the spring retaining ring 264 and extends through a slot 268 in the body member 252 to both orient and limit the movement of the head assembly.

End cap 253 includes an expansible chamber 269 into which fluid under pressure is introduced as through the terminal 270. The fluid escapes through the hollow passageway inside piston 255 and through aperture 271 in washer 262 to apertures 272 and 273. The electrical leads 274 may be serially brought through holes in washer 262, plug 260 and end cap 253 as is clearly illustrated, and may be sealed in the hole in plug 260.

When compressed fluid is applied to the chamber 269, the fluid acts against the surface 255' of piston 255 to provide a force to overcome the bias of compression spring 265 to move the head assembly toward the recording medium 258. The air escaping through the apertures 272 and 273 prevents the head assembly from contacting the recording medium 258 due to the jet stream and the presence of a high pressure air film between the recording medium 258 and the adjacent surface of plastic portion 257.

Since this modification of the invention operates on an air bearing principle the operating conditions are similar to those described in connection with FIGURE 1. Thus the apertures 272 and 273 should be located on the plastic portion 257 within an area which terminates approximately five aperture diameters from the periphery of the cylinder 259.

A symmetrical disposition of the apertures is preferred and is desirable if more than one is used, and more than two apertures may be used if desired.

It has been found that by using an orifice or aperture having a funnel shaped or diverging opening as illustrated by apertures 272 and 273, the air bearing effect provides a greater position correcting force for a given head spacing than with a cylindrical opening as shown in the other embodiments.

Figure 11:
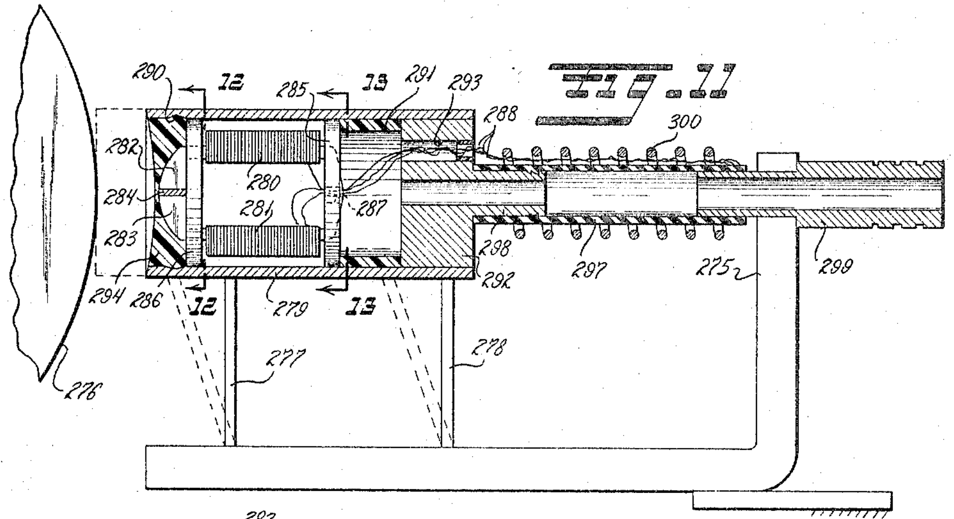
FIGURE 11 is a diametral section through a still further embodiment of an electromagnetic head mounting.

According to the embodiment illustrated in FIGURE 11 an L shaped frame member 275 may be rigidly mounted adjacent a rotating drum recording medium 276. A movable head assembly may be mounted on flexible reeds 277 and 278 which may be, for example, made of thin beryllium copper strips soldered to the frame member 275 and to the barrel 279.

Figure 13:
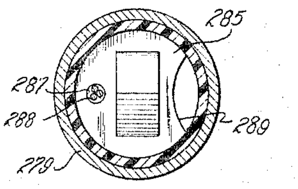
FIGURE 13 is a cross-sectional view of the operating end of the head taken along line 13—13 of FIGURE 11.

The electromagnetic coils 280 and 281 are wound around the core pieces 282 and 283 which are mated together with a thin brass shim 284 inserted between the ends adjacent the record surface 276. Resilient washers 285 and 286, which may be made of nylon, are slipped over the opposite ends of and cemented to the core pieces 282 and 283. A hole 287 more clearly shown in FIGURE 13, is provided in washer 285 in which the lead-in wires 288 are cemented and opening 289 is used as an air passageway.

The assembled coils 280 and 281 are inserted into barrel 279 with the lower side of washer 286 even with an undercut 290 in the barrel 279. The diameter of washers 285 and 286 is substantially the same as the inner diameter of the barrel 296 so as to provide a tight sliding fit. A bushing 291 is slipped into the barrel behind the head assembly and a brass plug 292 is force-fitted into the barrel 279 in airtight relationship after the lead-in wires 288 have been brought through and sealed in aperture 293.

Figure 12:
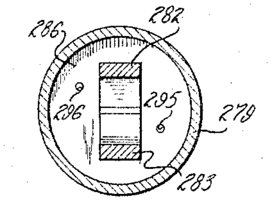
FIGURE 12 is a cross-sectional view of the head taken along line 12—12 of FIGURE 11.

A plastic potting compound 294 is poured into the head of the barrel 279 and flows into the undercut 290 locking the coil assembly from further downward movement. The lower surface of plastic member 294 is ground slightly concave to fit the periphery of the drum. Apertures 295 and 296 shown in FIGURE 12 may be holes drilled through the plastic potting compound 294 and washer 286 and located anywhere within an area which terminates approximately five aperture diameters from the periphery of barrel 279 as discussed in connection with FIGURE 10.

A thin flexible tube 297 of resilient material, such as neoprene, fits over a boss 298 of the plug 292 and tubular member 299 is forced through the L frame 275 and into the tube 297. A spring 300 may enclose the tube 297 to limit its radial expansion. In this embodiment the spring 300 is not directly connected between the frame 275 and the plug 292 to specifically affect the position of the movable head assembly, though it does affect to some extent the axial expansion of flexible tube 297 in the course of limiting its radial expansion.

Fluid pressure is applied through tubular member 299, flexible tube 297 and plug 292 into the chamber inside bushing 291. Opening 289 in washer 285 permits the fluid to escape to the lower portion of the barrel and through apertures 295 and 296 adjacent the recording medium 276.

With no fluid pressure applied, the movable head assembly takes the position shown in solid lines. With fluid pressure applied, the flexible tube 297 expands axially due to the fact that the apertures 295 and 296 as well as other passages cannot pass as large a volume of air as is supplied to barrel 299, and therefore a pressure is built up inside flexible tube 297. The axial expansion of flexible tube 297 causes reeds 277 and 278 to deflect and the lower end of barrel 279 to move toward the recording medium. The fluid jet streams escaping from apertures 295 and 296 cooperate with the air film which comprises an air bearing between the bottom of the plastic member 294 and the recording medium to provide a force tending to separate and prevent actual contact between the lower end of barrel 279 and the recording medium 276. Should the head move too closely to the recording medium 276, or similarly, should the recording medium have radial variations in its periphery that extend toward the head, the force due to the fluid escaping from apertures 295 and 296 toward recording medium 276 will move the head away from recording medium to prevent contact with and damage to the record surface. If the head moves too far away, this force is reduced and the axial expansion of flexible tube 297 moves the head toward a condition of balance.

Figure 14:
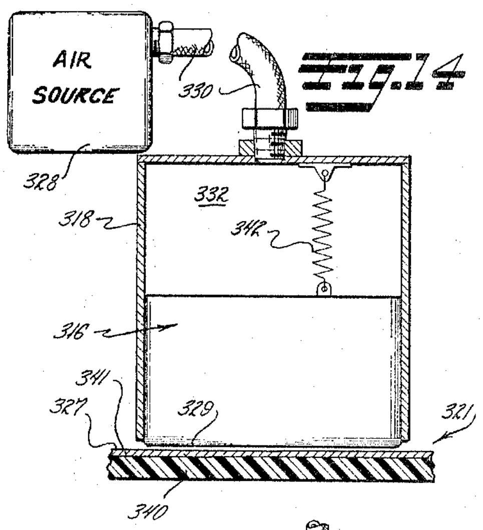
FIGURE 14 is a diagrammatic view in section of another embodiment of a magnetic recording device constructed in accordance with the broader aspects of the present invention.
Figure 15:
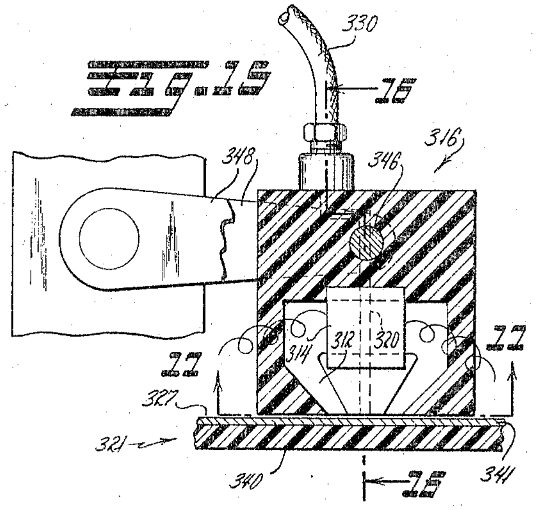
FIGURE 15 is an elevation view partly in section of an additional embodiment of a magnetic recording device constructed in accordance with the present invention.
Figure 16:
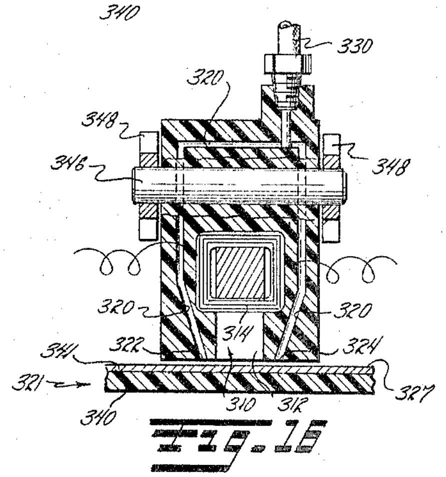
FIGURE 16 is a sectional view taken along line 16—16 of FIGURE 15.
Figure 17:
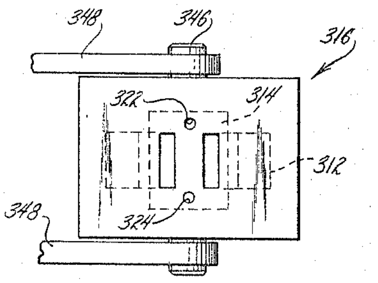
FIGURE 17 is a sectional view taken along line 17—17 of FIGURE 15.

Referring now to FIGURE 14, a solid body 316 of non-magnetic material such as plastic surrounds the actual electromagnet head 310, the details of which are shown in FIGURES 15 and 16. The electromagnetic head 310 consists of a core structure 312 and a coil 314 mounted thereon which may be embedded in a solid body piston to form a piston 316 mounted within a cylinder 318. The axis of the piston 316 and cylinder 318 is normal to the record surface 321 and, if the record surface 321 is the periphery of the magnetic drum, the axis of the piston and cylinder is substantially normal to the surface of the drum. Small air passages 320 are formed through the piston 316 from its end remote from the record medium 321 to its end adjacent the record medium and these terminate in outlet ports 322 and 324 disposed at each side of the end faces of the electromagnetic head as is clearly shown in FIGURES 16 and 17. Air under pressure from a suitable source 328 is introduced by a conduit 330 to the chamber 332 within the cylinder 318 at the end of the piston 316 remote from the recording medium 321. This pressure forces the piston downwardly toward the record medium. A small amount of the air introduced into the chamber above the piston escapes through the passages 322 and 324 and is discharged between the record medium surface 327 and the adjacent face 329 of the piston 316. The air escaping from the openings 324 and 326 spreads out and forms the thin film of air between the record medium and the adjacent surface 329 of the piston 316 maintaining the two slightly separated but at a minimum distance. Using this principle, very large magnetic record drums of lightweight welded sheet metal construction with a magnetizable peripheral surface may be used and discrete data indicative signals can be intelligably recorded even with more sharp definition than is achieved on the ordinary small solid magnetic drum type storage unit of conventional construction.

Figure 18:
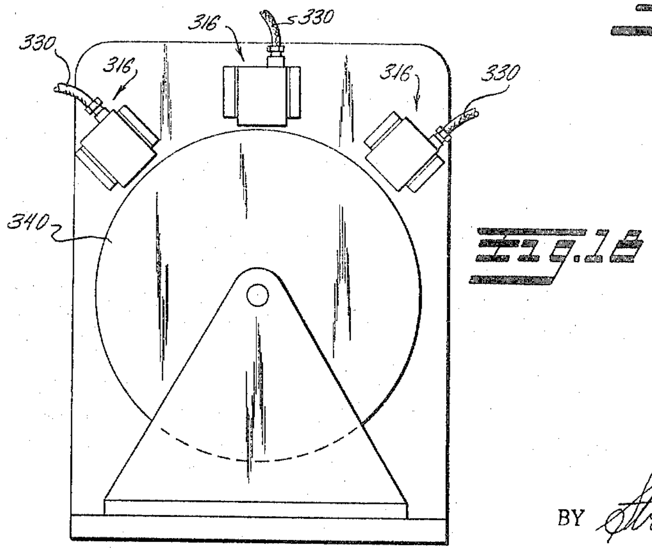
FIGURE 18 is a diagrammatic view illustrating the magnetic recording device of the present invention embodied in a magnetic drum type storage unit.

FIGURE 18 illustrates the electromagnetic recording device of the present invention applied to a large diameter record drum. As illustrative of the principles of the present invention, the drum 340 may be of lightweight sheet metal construction forming a carrier for a magnetizable medium layer 341 such as the conventional dispersion of magnetizable particles utilized in the formation of magnetic recording tapes and as disclosed in application for United States Letters Patent No. 375,002 filed August 18, 1953, now Patent No. 2,977,178 for Computer Memory Section Improvements, by Albert S. Hook et al. Actual experiments with sheet metal drums of this type known to have several thousandths of an inch variation from a true cylindrical shape showed that the electromagnetic heads mounted in accordance with the principles of the present invention maintain a gap of four-ten thousandths of an inch between the head and drum peripheral surface with less than 5% variation in the strength of recorded signal. The spring 342 (FIGURE 14) biases the electromagnetic head away from the record medium surface so that the electromagnetic head is withdrawn from contact with the record surface upon termination of the air pressure applied to the piston.

Referring now to FIGURE 15, a modified form of mounting the electromagnetic head in accordance with the present invention is disclosed. In this modified mounting, the body 316 which may be substantially identical with the piston of the embodiment shown in FIGURE 14 is pivotally mounted as at 346 upon unitarily connected and pivoted levers 348. In this embodiment of the invention, the air hose 330 is attached directly to the end of the passage through the body 316. Suitable mechanical interlocks may be provided to withdraw the body 316 from the surface of the record medium upon termination of the flow of air. During normal operation, the body 316 containing the electromagnetic head 310 may be suitably biased by any suitable means toward the surface of the record medium and so long as the air supply is maintained, a thin stream of air will separate the poles of the electromagnetic head and the adjacent surface of the record medium by an optimum amount for high intensity discrete signal recordation and this separation will be maintained substantially constant irrespective of the absolute movement of either the head or the record medium.

The invention may be embodied in other specific forms without departing from the spirit or essential characteristics thereof. Many details of the various embodiments may be interchanged as for example the use of converging apertures as well as the number and spacing of the apertures. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In the combination of a transducer unit with an intelligence storage unit having a moving surface wherein the efficiency of intelligence transfer is dependent upon the spacing therebetween, means for providing a constant spacing between said units comprising; a support, one of said units being reciprocably mounted on said support, a first means responsive to fluid pressure connected to said one unit for urging said units together when fluid pressure is applied, a second means responsive to fluid pressure carried by said transducer unit for urging said units apart when fluid pressure is applied, and means operative to separate said units when fluid pressure is not applied.

2. In the combination of a transducer unit with an intelligence storage unit having a moving surface wherein the efficiency of intelligence transfer is dependent upon the spacing therebetween, means for providing a constant spacing between said units comprising; a support, one of said units being reciprocably mounted on said support, a first means responsive to fluid pressure connected to said one unit for urging said units together when fluid pressure is applied, a second means responsive to fluid pressure carried by said transducer unit for urging said units apart when fluid pressure is applied, and means operative to separate said units when fluid pressure is not applied, and means for supplying fluid under pressure to both said fluid responsive means.

3. A transducer for use with a moving record, the recording efficiency between which is affected by the spacing therebetween comprising a fixed support, a housing for said transducer, means for mounting the housing on said support to permit movement of the transducer normal to the direction of movement of the record, an aperture in the housing confronting the moving record, a fluid conduit terminating in said aperture, fluid pressure responsive means connected between the housing and the support operative to displace said housing and transducer toward said moving record, and means for supplying fluid under pressure to both said fluid conduit and said fluid pressure responsive means.

4. A transducer whose recording efficiency is affected by its spacing from a moving record medium comprising a support, a housing for said transducer, a surface on said housing adapted to be mounted to confront a moving record medium, an aperture located in said surface and spaced from the boundary thereof, a fluid passageway connected to said aperture, means reciprocally mounting said housing on said support to permit movement of said housing surface in a direction parallel to the axis of said aperture, means responsive to fluid pressure connected between said support and said housing, and means for supplying fluid under pressure to both said fluid pressure responsive means and said fluid passageway.

5. A transducer head for scanning a record member, which includes: transducer means adapted to scan the record member, said transducer means having a surface adjacent and substantially parallel to the record member; an aperture confronting said record member located in said surface and spaced from the boundaries thereof; a fluid passageway terminating in said aperture; fluid responsive means connected to said surface for moving the transducer and the surface closer to said record member; and means for supplying fluid under pressure to said fluid responsive means and said fluid passageway.

6. A transducer head for scanning a record member, which includes: a support, transducer means adapted to scan said record member; said transducer having a surface confronting said record member; a fluid passageway terminating in an aperture located in said surface; an expansible chamber connected between said surface and said support for moving the surface with respect to said record member by expanding when fluid pressure is supplied and contracting to normal size when said pressure is removed; and means for supplying fluid under pressure to said expansible chamber and said fluid passageway.

7. In combination, a magnetic record medium mounted in a frame for movement in a predetermined path, an electromagnetic head assembly operatively associated with said record medium, means resiliently mounting said head assembly for reciprocal movement in a direction normal to said path and biasing said head assembly away from said record medium, a fluid responsive expansible chamber connected between said frame and said head assembly to move the head assembly against the bias of said resilient mounting means toward the record medium by expanding when supplied with fluid pressure and contracting to normal size when said pressure is removed, said head assembly having a fluid conduit terminating in an aperture confronting said record medium to provide a jet of fluid under pressure to prevent said head assembly from contacting said record medium when fluid pressure is supplied, and means for supplying fluid under pressure to said chamber and said conduit.

8. A transducer head for scanning a record member, which includes: a supporting member adapted to be held in a fixed position; transducer means adapted to scan said member; a housing for said transducer means having a surface confronting said record member and a fluid passageway terminating in an aperture in said surface; resilient mounting means connecting said housing to said supporting member for reciprocating movement with respect to said supporting member, said mounting means normally biasing said housing away from said record member; an expansible chamber connected to said record member in a direction generally perpendicular to the confronting surface of said record member, said chamber being fluid connected to said fluid passageway in said housing; and means for supplying fluid under pressure to said expansible chamber to expand the chamber and move the housing toward said record member and to provide a fluid stream from said aperture to prevent said housing from contacting the record member.

9. A transducer head as defined in claim 8 in which the expansible chamber is a Bourdon type tube.

10. A transducer head as defined in claim 8 in which said expansible chamber is a piston mounted in a cylinder.

11. A transducer having opposed heads between which a thin flexible magnetic disk is adapted to be turned comprising resilient means supporting each of said transducers on a frame member so that the spacing between the heas is variable, a fluid pressure responsive means connected between each transducer and said frame member to displace the transducers toward each other when fluid pressure is applied, each head having a fluid conduit terminating in an aperture confronting the record medium to provide a fluid pressure stream preventing the heads from contacting the thin disk when fluid pressure is applied, and means for supplying fluid under pressure to both said fluid pressure responsive means and said fluid conduit.

12. A transducer head for scanning a record member which includes: a record member; a fixed supporting member; transducer means adapted to scan said record member, said transducer means being movably mounted with respect to said support; retracting means urging said transducer means away from said record member; fluid operated advancing means connected to said support and said transducer means, adapted to move said transducer means toward said record member; and jet means connected to said transducer means and adapted to direct a stream of fluid under pressure against said record member to maintain a constant separation between said transducer means and said record member.

13. A transducer head for scanning a record member which includes: a record member; transducer means positioned to scan said record member and urged away from said member; and fluid operated advancing means connected to said transducer means and operable, upon the application of fluid under pressure, to move said transducer means toward said member, a portion of said fluid under pressure being discharged in a jet against said record member to prevent contact and maintain constant spacing between said transducer means and said record member.

14. A magnetic storage device which includes a rotatable member having a magnetizable surface, an electromagnetic head, a body surrounding said head and providing a surface fixed relative to said head and adjacent said magnetizable surface of the rotatable member, means mounting said body adjacent said magnetizable surface for movement in a predetermined path toward and from said magnetizable surface, means biasing said body toward said magnetizable surface, means operative to produce a thin fluid between said magnetizable surface and the adjacent surface of said head, which film constitutes the sole medium maintaining separation of said adjacent surfaces, said means including means operable to introduce a stream of air between said adjacent surfaces adjacent said electromagnetic head, means for shifting said head and body away from said magnetizable surface, and means including an expansible chamber connected in fluid communication with said stream introducing means for disenabling said shifting means only so long as said stream introducing means is operative.

15. In the combination of a transducer unit with an intelligence storage unit having a moving surface wherein the efficiency of intelligence transfer is dependent upon the spacing therebetween, means for providing a constant spacing between said units comprising a support, one of said units being reciprocably mounted on said support, a first means responsive to fluid pressure connected to said one unit for urging said units together when fluid pressure is applied, and a second means responsive to fluid pressure carried by said transducer unit for urging said units apart when fluid pressure is applied.

16. In a system utilizing a medium on which signals are adapted to be magnetically recorded and a transducer for recording and reproducing signals on said medium, apparatus for maintaining a predetermined positional relationship between said transducer and said medium comprising means providing a source of fluid under pressure, a structure for supporting said transducer disposed with a surface thereof opposed to said recording medium, said transducer having portions adapted to magnetically cooperate with said recording medium, said structure having an orifice therein extending through said surface, said structure also having another surface disposed opposite from said first named surface, the area of said first named surface being larger than the area of said last named surface, means for applying said fluid from said source through said orifice to provide a film of said fluid between said recording medium and said first named surface, and means for applying said fluid from said source upon said last-named surface for applying a force against said support structure to compress said film.

17. In a system utilizing a medium on which signals are adapted to be magnetically recorded and a transducer for recording and reproducing signals on said medium, apparatus for maintaining a predetermined positional relationship between said transducer and said medium comprising means providing a source of fluid under pressure, a structure for supporting said transducer having a surface opposed to said recording medium, said transducer having portions adapted to cooperate with said recording medium exposed on said surface, said structure also having another surface disposed opposite from said first-named surface, said structure having an orifice extending therethrough from said last-named surface to said first-named surface, and means for directing said fluid from said source against said last-named surface and through said orifice to provide a film of fluid between said recording medium and said first-named surface whereby said fluid from said source upon said last-named surface provided a force against said support structure to compress said film.

18. In a system utilizing a medium on which signals are adapted to be magnetically recorded and a transducer for recording and reproducing signals on said medium, apparatus for maintaining a predetermined positional relationship between said transducer and said medium comprising means providing a source of fluid under pressure, a structure for supporting said transducer in cooperative relationship with said medium having oppositely disposed front and rear surfaces, said transducer having portions adapted to magnetically cooperate with said recording medium, a chamber having an opening on one side thereof, means for supporting said structure in said opening with said rear surface in said chamber and said front surface out of said chamber, the sides of said structure and the periphery of said opening being spaced from each other to define an air gap therebetween, said structure having an orifice extending therethrough from said front surface to said rear surface, the area of said front surface being larger than the area of said rear surface, and means for applying said fluid from said source into said chamber whereby fluid enters said orifice through said rear surface and is exhausted through said front surface between said recording medium and said first-named surface to provide a film of said fluid therebetween, said fluid exerting a force upon said rear surface for a force against which to compress said film.

19. In a system utilizing a recording medium on which signals are adapted to be magnetically recorded, a magnetic transducer for scanning a surface of said medium adapted to record and reproduce signals thereon, said magnetic transducer having a front surface and a back surface, said front surface being disposed opposite from the surface of said medium so as to be separated therefrom by a fixed distance, means for applying a force of constant magnitude upon said back surface of said transducer, means including a film of pressurized fluid for establishing oppositely directed forces between said front surface of said transducer and said surface of said recording medium, and said last-named means providing said force upon said front surface of said transducer equal to said force upon said back surface of said transducer when said distance between said front surface of said transducer and said surface of said recording medium is said fixed distance.

20. A magnetic recording system comprising a magnetic recording medium constituted of a substantially rigid body having a recording surface on which signals are adapted to be magnetically recorded, a magnetic transducer for scanning said surface for recording and reproducing signals thereon, said magnetic transducer having a front surface disposed opposite from said recording surface of said body so as to be separated therefrom by a predetermined distance, a structure in which said transducer is mounted having a pair of opposite ends, said front surface being exposed from said structure at one of said ends thereof, means for applying a force of constant magnitude upon said other end of said mounting structure to advance said mounting structure and said transducer toward said recording surface comprising a chamber having an opening in one of said walls into which the other end of said mounting structure extends, means for introducing a compressible fluid medium under pressure into said chamber whereby to tend to force said mounting structure out of said chamber, means including a film of pressurized fluid to establish oppositely directed forces between said one end of said transducer mounting structure and said recording surface to tend to force said other end of said mounting structure into said chamber, said last-named means providing forces varying in magnitude dependent upon the separation between said recording surface and said one end of said transducer mounting structure, and said forces on said opposite ends being equal when said distance between said front surface of said transducer and said recording surface is said predetermined distance.

21. The invention according to claim 20 wherein the cross-sectional dimensions of said other end of said mounting structure are similar to and slightly smaller than corresponding cross-sectional dimensions of said opening whereby to provide clearance between the wall of said chamber having said opening and said other end of said mounting structure through which said compressible fluid medium is exhausted whereby to provide a bearing for said mounting structure.

22. The invention according to claim 20 including a body of resilient material in said opening disposed between said other end of said mounting structure and the periphery of the wall of said chamber defining said opening for supporting said other end in said chamber.

23. In a system utilizing a recording medium on which signals are adapted to be magnetically recorded, a transducer for scanning said medium to record and reproduce signals thereon, said transducer having a front portion disposed opposite from said medium and a rear portion, means including a film of pressurized fluid for establishing oppositely directed forces between said front portion of said transducer and said recording medium varying in magnitude in accordance with the distance between said front portion and said recording medium, means for establishing a constant force upon said rear portion of said transducer in a direction opposite to said force upon said front portion of said transducer, and means for supporting said transducer for displacement towards and away from said recording medium, said force applied to said rear portion of said transducer having a certain value to provide for equilibrium thereof with said force on said front portion of said transducer when said distance between said recording medium and said front portion is equal to a predetermined distance.

24. The invention as set forth in claim 23 wherein said means for supporting said transducer comprising a stationary structure, a lever pivotally mounted adjacent one end thereof to said stationary structure, and means for securing said lever to said transducer adjacent the opposite end thereof.

25. In a recording system utilizing a recording medium on which signals are adapted to be magnetically recorded, a transducer for scanning said medium to record and reproduce signals thereon, said transducer having a front portion disposed opposite from said medium and a rear portion, a housing for said transducer, said front portion of said transducer being exposed to said record from one end of said housing, said housing having an orifice extending therethrough from said one end to said opposite end thereof, means for exhausting a pressurized compressible fluid through said orifice for establishing oppositely directed forces between said front portion of said transducer and said recording medium varying in magnitude in accordance with the distance between said front portion and said recording medium, said last named means also including means for admitting said fluid into the opening of said orifice on said opposite end of said transducer housing for establishing a constant force upon said rear portion of said transducer in a direction opposite to said force upon said front portion of said transducer, and means for supporting said transducer for displacement toward and away from said recording medium, said force applied to said rear portion of said transducer having a certain value to provide for equilibrium thereof with said force on said front portion of said transducer when said distance between said recording medium and said front portion is equal to a predetermined distance.

26. In a system for utilizing a recording medium on which signals are adapted to be magnetically recorded, a magnetic head having a signal gap in one portion thereof, a housing for supporting said magnetic head with said signal gap disposed opposite to said recording medium, said housing being a unitary structure having a forward section and a rear section, the end of said rear section and the end of said front section being disposed at opposite ends of said housing, said pole section of said magnetic head being exposed from said end of said front portion of said housing, said housing having an orifice extending therethrough from said rear section to said end of said front section thereof, a walled chamber, one of said walls having an opening therein, the diameter of said opening being slightly greater than the diameter of said rear portion, a support structure secured to said chamber walls, flexible means for supporting said housing for displacement toward and away from said recording medium with the rear portion thereof extending through said opening into said housing, and means for introducing fluid medium under pressure into said chamber.

27. A system using a magnetic recording medium comprising a magnetic head having pole portions which define a signal gap, a housing containing said magnetic head, said housing having front and rear sections, opposite end surfaces of said housing being disposed at the ends of said front and rear sections thereof, said pole portions of said head being exposed from said front end of said housing adjacent said recording medium, a walled chamber having an opening therein, said rear section of said housing extending through said opening into said chamber, a sleeve secured to the wall of said chamber having said opening therein and surrounding said front section of said housing, the inner surface of said sleeve being spaced from the surface of said front section of said housing so as to provide a gap therebetween, said sleeve having at least one orifice therein extending from said inner surface thereof, one of the walls of said chamber having an orifice therein, said orifice in said wall communicating said chamber with said orifice in said sleeve, said recording medium being disposed opposite from said front surface of said housing, said housing having an orifice therein extending from said rear portion thereof through said front surface thereof, and means for introducing a compressible fluid under pressure in said chamber.

References Cited by the Examiner

UNITED STATES PATENTS

| | | | |
|---|---|---|---|
| 1,145,798 | 7/1915 | Ross | 251—282 X |
| 1,749,924 | 3/1930 | Runge et al. | 251—62 X |
| 2,362,667 | 11/1944 | Schmidt | 308—160 |
| 2,612,566 | 9/1952 | Anderson | 179—100.2 |
| 2,737,646 | 3/1956 | Muffly | 346—74 |

FOREIGN PATENTS

| | | |
|---|---|---|
| 688,554 | 3/1953 | Great Britain. |

BERNARD KONICK, *Primary Examiner.*

NEWTON N. LOVEWELL, L. M. ANDRUS, STEPHEN W. CAPELLI, NORMAN H. EVANS, IRVING L. SRAGOW, *Examiners.*

D. G. REDINBAUGH, A. L. BRODY, H. W. HERMANN, R. J. McCLOSKEY, A. I. NEUSTADT, *Assistant Examiners.*